3,272,848
PROCESS FOR THE PREPARATION OF EQUILIN
Douglas S. Irvine, Rosemere, Quebec, Jehan F. Bagli, Montreal, Quebec, Peter F. Morand, Ottawa, Ontario, Claude Vezina, Oka, Quebec, and Karel Wiesner, Westmount, Quebec, Canada, assignors to American Home Products Corporation, New York, N.Y., a corporation of Delaware
No Drawing. Filed Jan. 20, 1964, Ser. No. 338,636
18 Claims. (Cl. 260—397.3)

The present invention relates to a process for preparing steroids with an aromatic structure in ring A.

More particularly, the present invention relates to the partial synthesis of equilin, an important estrogenic hormone, and to certain novel intermediates used in the synthesis of equilin.

Moreover, this invention relates to a process for preparing equilin which process appears to be superior to the presently available process as described in the chemical literature.

There is, for example, a process for the preparation of equilin described by J. A. Zderic et al. in Steroids 1, 233 (1960); J. Am. Chem. Soc., 80, 2596 (1958); and in U.S. Patent No. 3,067,212. As distinguished therefrom, the process of this invention uses either estra-4,6-diene-3,17-dione (Ia), prepared as described in our copending application Serial No. 337,753, filed Jan. 15, 1964, or 17β-acetoxyestra-4,6-dien-3-one (Ib), prepared as described in U.S. Patent No. 3,067,212, or 17β-acetoxyandrosta-4,6-dien-3-one (Ic), prepared as described in Wettstein in Helv. Chim. Acta, volume 23, p. 388 (1940), as starting materials.

In a preferred embodiment of our invention estra-4,6-diene-3,17-dione (Ia) may be reacted with acetic anhydride, acetyl chloride, and pyridine, to yield the corresponding enol acetate, 3-acetoxyestra-3,5,7-trien-17-one (IIa), and the latter compound, when subjected to selective base-catalysed hydrolysis using alkali metal alkoxides of lower alkanols, such as, e.g., potassium t-butoxide, or potassium methoxide, or alkali metal bicarbonate, preferable sodium bicarbonate, is smoothly deconjugated to yield the corresponding $\Delta^{4,7}$-3-ketone, estra-4,7-diene-3,17-dione (IIIa).

In the same manner 17β-acetoxyestra-4,6-dien-3-one (Ib) yields the corresponding enol acetate, 3,17β-diacetoxyestra-3,5,7-triene (IIb, previously described in U.S. Patent No. 3,067,212 as having been obtained in the same manner), and the latter compound upon selective hydrolytic deconjugation as described above yields the corresponding $\Delta^{4,7}$-3-ketone, 17β-hydroxyestra-4,7-dien-3-one (IIIb).

Again in the same manner, 17β-acetoxyandrosta-4,6-dien-3-one (Ic), yields the corresponding enol acetate, 3,17β-diacetoxyandrosta-3,5,7-triene (IIc), and the latter compound upon selective hydrolytic deconjugation as described above yields the corresponding $\Delta^{4,7}$-3-ketone, 17β-hydroxyandrosta-4,7-dien-3-one (IIIc).

Hydrolysis of the enol acetates (IIa, b, c,) to the deconjugated $\Delta^{4,7}$-3-ketones (IIIa, b, c,) is a new and unexpected reaction. Although the deconjugation of steroidal $\Delta^4$-3-ketones via the base-catalysed hydrolysis of their enol acetates is well documented [see, e.g., A. J. Birch, J. Chem. Soc., 2325 (1950); W. J. Dauben and J. F. Eastham, J. Am. Chem. Soc., 72, 2305 (1950); B. Belleau and I. F. Gallagher, ibid., 73, 4458 (1951)], Ringold and Malhotra have recently reported [Tetrahedron Letters No. 15,669 (1962)] that they were unable to deconjugate steroidal $\Delta^{4,6}$-3-ketones.

Contrary to expectations, in the process of this invention the deconjugation of the $\Delta^{3,5,7}$-enol acetates (IIa, b, c) of steroidal $\Delta^{4,6}$-3-ketones proceeds smoothly, by using a base-catalysed selective hydrolysis, to yield the desired deconjugated $\Delta^{4,7}$-3-ketones (IIIa, b, c). Suitable bases for effecting the above selective hydrolysis and deconjugation are the alkali metal alkoxides of lower alkanols, such as, e.g., potassium methoxide or t-butoxide, or sodium methoxide, or alkali metal bicarbonates, preferably sodium bicarbonate in lower alkanols, preferably methanol.

The above selective hydrolytic deconjugation may be carried out at temperatures from 0°–100° C., with the preferred range being from room temperature (usually 20°–24° C.) to the boiling temperature of the reaction mixture. The optimal time of reaction varies with the temperature. For optimal yields the time of reaction is varied in accordance with the temperature conditions maintained, the time periods of reaction becoming shorter at elevated temperatures than, e.g., when operating at room temperature. The time of reaction may be varied within the limits of from 2 minutes to 2 hours, with the preferred range being from about 5 minutes to about 10 minutes. At the end of the reaction period the reaction is quenched by adding dilute aqueous acid, such as, e.g., boric acid or acetic acid, and the desired deconjugated $\Delta^{4,7}$-3-ketone may be isolated by solvent extraction and purified by chromatography.

In actual practice it has been found that optimal yields of the deconjugated ketones (IIIa, b, c) are best achieved in following progress of the reaction by sampling the reaction mixture at frequent intervals; quenching the samples; determining the amounts of the deconjugated ketone (IIIa, b, c) and of the starting material (the enol acetates IIa, b, c) in each sample by u.v. spectrography; and stopping the reaction by quenching when the u.v. spectrum indicates that all the enol acetate (IIa,b,c) has disappeared.

When exposing either estra-4,7-diene-3,17-dione (IIIa), or 17β-hydroxyestra-4,7-dien-3-one (IIIb) to the activity obtainable in a substantially neutral medium inoculated, for example, with the microorganism *Nocardia restrictus*, equilin (IV) is obtained, as described in our copending application Serial No. 337,753, filed Jan. 15, 1964.

Alternatively, 3-acetoxyestra-3,5,7-trien-17-one (IIa) may also be converted to equilin (IV) in the same manner. This microbiological aromatisation of ring A is shown to be unexpectedly successful when using the above enol acetate as the starting material.

Those microbiological conversions to equilin may be achieved by exposing the above compounds to the enzymatic activity obtainable from a growing culture of *Nocardia restrictus*, or to the enzymatic activity obtainable from the spores of the same organism in accordance with the procedure described in U.S. Patent 3,031,379. A similar microbiological transformation has been described in U.S. Patent 3,067,212.

Alternatively, 17β-hydroxyandrosta-4,7-dien-3-one (IIIc) may be converted by chemical or microbiological means to androsta-1,4,7-triene-3,17-dione, and the latter compound may be converted to equilin (IV) as described in U.S. Patent 3,067,212.

The following formulae and examples will illustrate this invention.

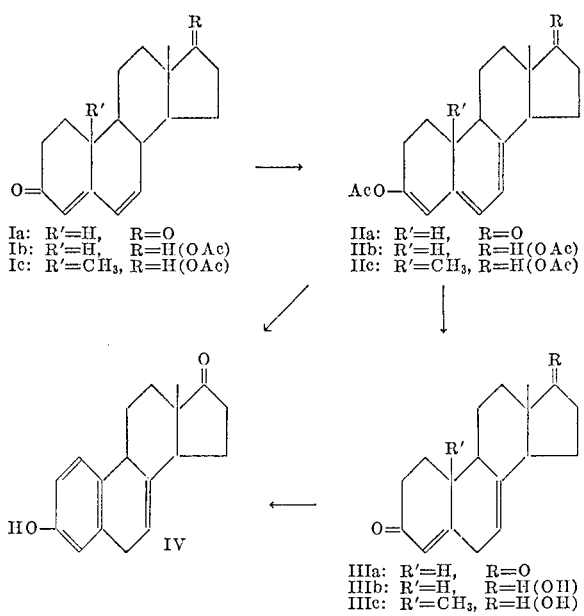

Ia: R'=H, R=O
Ib: R'=H, R=H(OAc)
Ic: R'=CH₃, R=H(OAc)

IIa: R'=H, R=O
IIb: R'=H, R=H(OAc)
IIc: R'=CH₃, R=H(OAc)

IIIa: R'=H, R=O
IIIb: R'=H, R=H(OH)
IIIc: R'=CH₃, R=H(OH)

Example 1

Estra-4,6-diene-3,17-dione (Ia, 758 mg.) is dissolved in acetic anhydride (15 ml.) and then freshly distilled acetyl chloride (6 ml.) and pyridine (0.6 ml.) are added. The reaction solution is refluxed for 2¼ hours under nitrogen and the solvents are removed under reduced pressure. The residue is taken up in methanol and on cooling a gel is formed. Filtration and washing of the filter cake with cold methanol gives a white powder identified as 3-acetoxyestra-3,5,7-trien-17-one (IIa), M.P. 173–176° C.; $[\alpha]_D^{23}$ +49.8° (1% in chloroform); λ max. 299 mμ (ε 16,800); 312 mμ (ε 21,100); 327 mμ (ε 15,000).

In the same manner, 17β-acetoxyandrostra-4,6-dien-3-one (Ic, 1 g.) described by Wettstein in Helv. Chim. Acta 23, 388 (1940), is dissolved in acetic anhydride (5 ml.) and freshly distilled acetyl chloride (1 ml.) is added. This solution is refluxed under nitrogen for nineteen hours. The reaction mixture is poured into ice cold methanol (12 ml.), concentrated under reduced pressure, and chilled. The resulting tan colored crystals are collected, washed with a little cold methanol and dried. The product, 3,17β-diacetoxyandrosta-3,5,7-triene (IIc) has M.P. 137–142° C., λ max 298 mμ (ε=14,300), 311 mμ (ε=17,500), 327 mμ (12,300).

Example 2

3-acetoxyestra-3,5,7-trien-17-one (IIa, 1.89 g.) is dissolved in dry methanol (365 ml.) and sodium bicarbonate (3.1 g.) is added. The reaction mixture is refluxed with stirring for ten minutes, cooled and poured into water containing acetic acid (3 ml.). The mixture is extracted with ethyl acetate and the combined extracts are washed with water, dried over magnesium sulfate and evaporated to dryness. The resulting syrup crystallizes from ether-acetone to give a solid with M.P. 140–142° C. Further crystallizations give pure estra-4,7-diene-3,17-dione (IIIa), M.P. 144–146° C., λ max. 238 mμ (ε 13,900). The same product is also obtained when treating compound (IIa) with 4 molar equivalents of sodium methoxide at room temperature for 25 minutes.

Similarly, 3,17β-diacetoxyestra-3,5,7-triene (IIb), described in U.S. Pat. 3,067,212, is treated with sodium bicarbonate or potassium methoxide, both in methanol, and worked up as above to yield 17β-hydroxyestra-4,7-dien-3-one (IIIb).

In the same manner, 3,17β-diacetoxyandrostra-3,5,7-triene (IIc, 160 mg.) is treated with sodium bicarbonate in methanol and worked up as above to yield a pale yellow gum which crystallizes from aqueous acetone to give 17β-hydroxyandrosta-4,7-dien-3-one (IIIc) as robust needles, M.P. 138–139° C., λ max. 239 mμ (ε=15,400).

Example 3

A culture of Norcardia restrictus (Ayerst Culture Collection No. B-226) is used to inoculate a medium of the following composition:

|  | G. |
|---|---|
| Commercial glucose ("Cerelose") | 20 |
| Hydrolysate of lactalbumin ("Edamin") | 20 |
| Corn steep liquor | 5 |
| Distilled water to pH 6.5, 1 liter. | |

The medium is distributed into 250-ml. Erlenmeyer flasks at the rate of 50 ml. medium per flask. Inoculated flasks are incubated at 25° C. for 64 hours. After incubation, the resulting culture is used to innoculate a medium of the same composition: 5 ml. of inoculant is used to inoculate 50 ml. of medium contained in a 250-ml. Erlenmeyer flask. Incubation is performed at 25° C. for 24 hours. After 24 hours of incubation, 25 mg. of 3-acetoxyestra-3,5,7-trien-17-one (IIa), dissolved in 0.5 ml. methanol is charged into the culture. The mixture is incubated at 25° C.; after 6 hours of incubation, the mixture is extracted twice with ethylene dichloride, and the resulting extract evaporated to dryness under nitrogen. Equilin (IV), identical with an authentic sample, accompanied by minor amounts of equilenin and estrone, is isolated by chromatography on silica gel as the main product of the reaction.

We claim:

1. 3-acetoxyestra-3,5,7-trien-17-one.

2. The process of preparing equilin which comprises treating estra-4,6-diene-3,17-dione with acetic anhydride and acetyl chloride in pyridine, thereby obtaining 3-acetoxyestra-3,5,7-trien-17-one; treating said last-named compound with a base selected from the group which consists of alkali metal alkoxides of lower alkanols, and alkali metal bicarbonates at a temperature within the range 0° C.–100° C., thereby obtaining estra-4,7-diene-3,17-dione; and subjecting said last-named compound to the enzymatic activity of the microorganism Nocardia restrictus in a substantially neutral medium, thereby obtaining equilin.

3. The process of preparing equilin which comprises treating 17β-acetoxyestra-4,6-dien-3-one with acetic anhydride and acetyl chloride in pyridine, thereby obtaining 3,17-β-diacetoxyestra-3,5,7-triene; treating said last-named compound with a base selected from the group which consists of alkali metal alkoxides of lower alkanols and alkali metal bicarbonates at a temperature within the range of 0° C.–100° C., thereby obtaining 17β-hydroxyestra-4,7-dien-3-one; and subjecting said last-named compound to the enzymatic activity of the microorganism Nocardia restrictus in a substantially neutral medium, thereby obtaining equilin.

4. The process of preparing equilin from a steroidal $\Delta^{4,6}$-3-ketone selected from the group which consists of estra-4,6-diene-3,17-dione and 17β-acetoxyestra-4,6-dien-3-one, which comprises treating said compound with acetic anhydride and acetyl chloride in pyridine, thereby obtaining a $\Delta^{3,5,7}$-enol acetate selected from the group which consists of 3-acetoxyestra-3,5,7-trien-17-one and 3,17β-diacetoxyestra-3,5,7-triene; treating said $\Delta^{3,5,7}$-enol acetate with a base selected from the group which consists of alkali metal alkoxides of lower alkanols and alkali metal bicarbonates at a temperature within the range of 0° C.–100° C., thereby obtaining a $\Delta^{4,7}$-3-ketone selected from the group which consists of estra-4,7-diene-3,17-dione, and 17β-hydroxyestra-4,7-dien-3-one; and subjecting said $\Delta^{4,7}$-3-ketone to the enzymatic activity of the microorganism Nocardia restrictus in a substantially neutral medium, thereby obtaining equilin.

5. The process of preparing equilin from a steroidal $\Delta^{4,6}$-3-ketone selected from the group which consists of estra-4,6-diene-3,17-dione and 17β-acetoxyestra-4,6-dien- 3-one, which comprises converting said $\Delta^{4,6}$-3-ketone to the corresponding $\Delta^{3,5,7}$-enol acetate; subjecting said $\Delta^{3,5,7}$-enol acetate to base-catalysed selective hydrolysis, thereby obtaining the corresponding deconjugated $\Delta^{4,7}$-3-ketone; and subjecting said $\Delta^{4,7}$-3-ketone to the enzymatic activity of the microorganism Nocardia restrictus in a substantially neutral medium, thereby obtaining equilin.

6. The process of preparing equilin which comprises converting estra-4,6-diene-3,17-dione to the corresponding enol acetate, 3-acetoxyestra-3,5,7-trien-17-one; subjecting said last-named compound to base-catalysed hydrolysis, thereby obtaining estra-4,7-diene-3,17-dione; and subjecting said last-named compound to the enzymatic activity of the microorganism Nocardia restrictus in a substantially neutral medium, thereby obtaining equilin.

7. The process of preparing equilin which comprises converting 17β-acetoxyestra-4,6-dien-3-one to the corresponding enol acetate, 3,17β-diacetoxyestra-3,5,7-triene; subjecting said last-named compound to base-catalysed hydrolysis, thereby obtaining 17β-hydroxyestra-4,7-dien-3-one; and subjecting said last-named compound to the enzymatic activity of the microorganism Nocardia restrictus in a substantially neutral medium, thereby obtaining equilin.

8. The process of preparing androsta-1,4,7-triene-3,17-dione which comprises treating 17β-acetoxyandrosta-4,6-dien-3-one with acetic anhydride and acetyl chloride in an organic base, thereby obtaining its corresponding enol acetate, 3,17β-diacetoxyandrosta-3,5,7-triene; subjecting said last-named compound to base-catalysed selective hydrolysis, thereby obtaining 17β-hydroxyandrosta-4,7-diene-3-one; and treating said last-named compound with a microorganism selected from the group consisting of Septomyxa affinis, Corynebacterium simplex and Bacillus sphaericus, thereby obtaining androsta-1,4,7-triene-3,17-dione.

9. The process of preparing androsta-1,4,7-triene-3,17-dione which comprises treating 17β-acetoxyandrosta-4,6-dien-3-one with acetic anhydride and acetyl chloride in pyridine, thereby obtaining 3,17β-diacetoxyandrosta-3,5,7-triene; subjecting said last-named compound, at a temperature within the range 0° C–100° C., to the action of a base selected from the group which consists of alkali metal alkoxides of lower alkanols and alkali metal bicarbonates, thereby obtaining 17β-hydroxyandrosta-4,7-dien-3-one; and treating said last-named compound with a reagent selected from the group consisting of selenium dioxide and dichlorodicyanoquinone, thereby obtaining androsta-1,4,7-triene-3,17-dione.

10. The process of preparing equilin which comprises subjecting 3-acetoxyestra-3,5,7-trien-17-one to selective hydrolysis and deconjugation by treating said compound with a base selected from the group which consists of alkali metal alkoxides of lower alkanols and alkali metal bicarbonates at a temperature within the range 0° C.–100° C., thereby obtaining estra-4,7-diene-3,17-dione; and subjecting said last-named compound to the enzymatic activity of the microorganism Nocardia restrictus in a substantially neutral medium, thereby obtaining equilin.

11. The process of preparing equilin which comprises subjecting 3,17β-diacetoxyestra-3,5,7-triene to selective hydrolysis deconjugation by treating said compound with a base selected from the group which consists of alkali metal alkoxides of lower alkanols and alkali metal bicarbonates at a temperature within the range 0° C.–100° C., thereby obtaining 17β-hydroxyestra-4,7-dien-3-one; and subjecting said last-named compound to the enzymatic activity of the microorganism Nocardia restrictus in a substantially neutral medium, thereby obtaining equilin.

12. The process of deconjugating the $\Delta^{3,5,7}$-enol acetate of a steroidal $\Delta^{4,6}$-3-ketone, which comprises treating said enol acetate with a base selected from the group which consists of alkali metal alkoxides of lower alkanols and alkali metal bicarbonates at a temperature within the range 0° C.–100° C. for a period of time sufficient to effect said deconjugation, not exceeding about 2 hours.

13. The process of deconjugating 3-acetoxyestra-3,5,7-trien-17-one which comprises treating said compound with sodium bicarbonate in dry methanol at the boiling point of said methanol, thereby obtaining estra-4,7-diene-3,17-dione.

14. The process of deconjugating 3-acetoxyestra-3,5,7-trien-17-one which comprises treating said compound with an excess amount of sodium methoxide at room temperature, thereby obtaining estra-4,7-diene-3,17-dione.

15. The process of deconjugating 3,17β-diacetoxyestra-3,5,7-triene which comprises treating said compound, in methanolic solution and at a temperature within the range 0° C.–100° C., with a base selected from the group which consists of alkali metal alkoxides of lower alkanols and alkali metal bicarbonates, thereby obtaining 17β-hydroxyestra-4,7-dien-3-one.

16. The process of deconjugating 3,17β-diacetoxyandrosta-3,5,7-triene which comprises treating said compound, in methanolic solution and at a temperature within the range 0° C.–100° C., with a base selected from the group which consists of alkali metal alkoxides of lower alkanols and alkali metal bicarbonates, thereby obtaining 17β-hydroxyandrosta-4,7-dien-3-one.

17. The process of preparing equilin which comprises treating estra-4,6-diene-3,17-dione with acetic anhydride and acetyl chloride in pyridine, thereby obtaining 3-acetoxyestra-3,5,7-trien-17-one; and subjecting said last-named compound to the enzymatic activity of the microorganism Nocardia restrictus in a substantially neutral medium, thereby obtaining equilin.

18. The process of preparing equilin which comprises subjecting 3-acetoxyestra-3,5,7-trien-17-one to the enzymatic activity of the microorganism Nocardia restrictus in a substantially neutral medium, thereby obtaining equilin.

References Cited by the Examiner

Zederic et al.: "Steroids," vol. 1, No. 3, March 1963, pp. 233–235 relied on.

LEWIS GOTTS, *Primary Examiner.*

ELBERT L. ROBERTS, *Examiner.*